United States Patent
Borsatti et al.

(10) Patent No.: US 8,430,377 B2
(45) Date of Patent: Apr. 30, 2013

(54) VALVE

(75) Inventors: Jean-Charles Borsatti, Vessy (CH); Osvaldo Mascarello, Milan (IT)

(73) Assignee: Parker-Hannifin Corporation, Cleveland, OH (US)

( * ) Notice: Subject to any disclaimer, the term of this patent is extended or adjusted under 35 U.S.C. 154(b) by 503 days.

(21) Appl. No.: 12/407,868

(22) Filed: Mar. 20, 2009

(65) Prior Publication Data
US 2009/0242814 A1   Oct. 1, 2009

Related U.S. Application Data

(60) Provisional application No. 61/039,445, filed on Mar. 26, 2008.

(51) Int. Cl.
*F16K 31/01*   (2006.01)

(52) U.S. Cl.
USPC ............... 251/129.15; 251/360; 285/368

(58) Field of Classification Search ............ 251/129.15, 251/360, 361, 362, 363; 285/368, 123.1–124.5
See application file for complete search history.

(56) References Cited

U.S. PATENT DOCUMENTS

| | | | | |
|---|---|---|---|---|
| 2,922,616 A * | 1/1960 | Budde | ............... | 251/148 |
| 2,937,038 A * | 5/1960 | Gondek | ............... | 285/323 |
| 3,757,263 A * | 9/1973 | Saarem et al. | ............... | 335/260 |
| 4,376,447 A * | 3/1983 | Chumley | ............... | 137/244 |
| 4,582,294 A * | 4/1986 | Fargo | ............... | 251/129.15 |
| 4,732,362 A * | 3/1988 | Morioka et al. | ............... | 251/129.17 |
| 5,102,096 A * | 4/1992 | Siegel et al. | ............... | 251/129.15 |
| 5,277,455 A * | 1/1994 | Graves et al. | ............... | 285/55 |
| 5,490,534 A * | 2/1996 | Van Rens | ............... | 137/1 |
| 5,580,031 A * | 12/1996 | Lorch | ............... | 251/174 |
| 6,086,042 A * | 7/2000 | Scott et al. | ............... | 251/129.15 |
| 6,144,275 A * | 11/2000 | Hirata et al. | ............... | 335/262 |
| 6,298,879 B1 | 10/2001 | Knapp | | |
| 6,405,752 B1 * | 6/2002 | Fritsch et al. | ............... | 137/550 |
| 6,668,853 B2 * | 12/2003 | Dean | ............... | 137/315.04 |
| 6,742,816 B2 * | 6/2004 | Rocheleau | ............... | 285/368 |

FOREIGN PATENT DOCUMENTS

| | | |
|---|---|---|
| DE | 10319632 A1 | 12/2004 |
| DE | 10334944 A1 | 2/2005 |
| EP | 1691121 A | 8/2006 |
| GB | 1401184 A | 7/1975 |

* cited by examiner

Primary Examiner — John K Fristoe, Jr.
Assistant Examiner — Seth Faulb
(74) Attorney, Agent, or Firm — Thomas G. Fistek

(57) ABSTRACT

A valve comprises a cup-shaped element presenting an outer surface on which a driver element is mountable and, inserted in said cup-shaped element, a core comprising at least one seal element arranged to block a first fluid passage provided in a bush, said core being movable within said cup-shaped element against the action of an elastic element between a first position in which said seal element rests on said bush such as to close its first passage and a second position in which said seal element is detached from said bush such as to open its first passage, said bush being associated with a closure element for the cup shaped element, the closure element presenting, for its fixing to the cup-shaped element, means cooperating with an inner surface of said cup-shaped element.

20 Claims, 3 Drawing Sheets

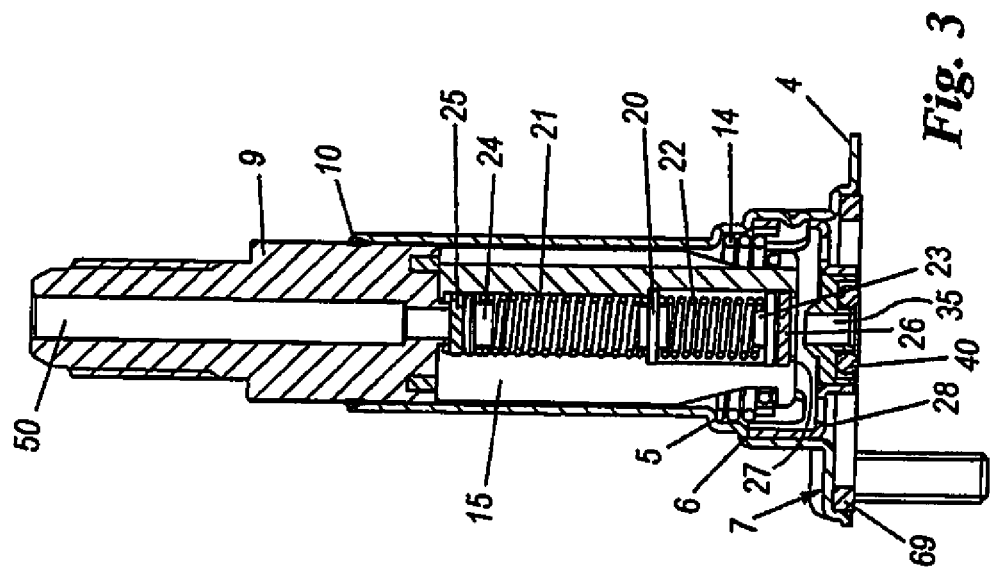
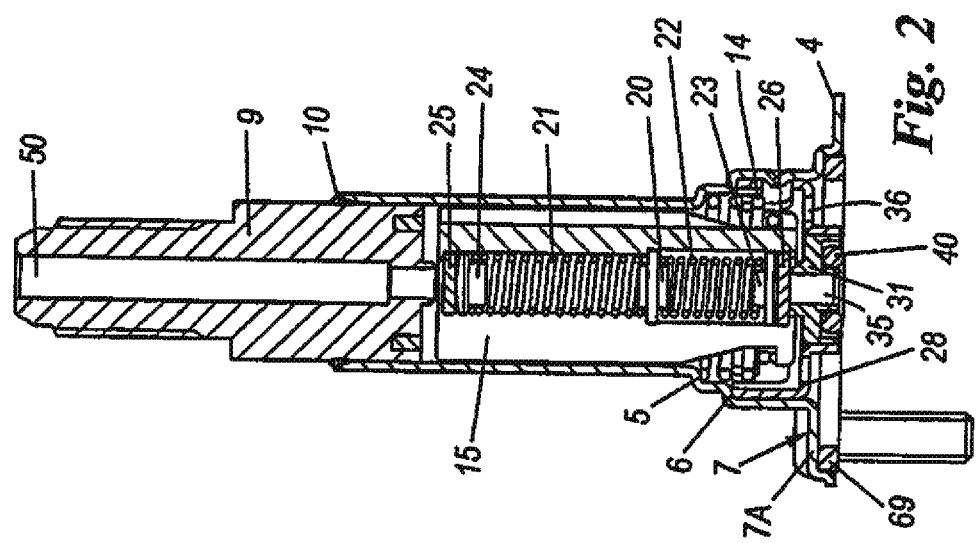

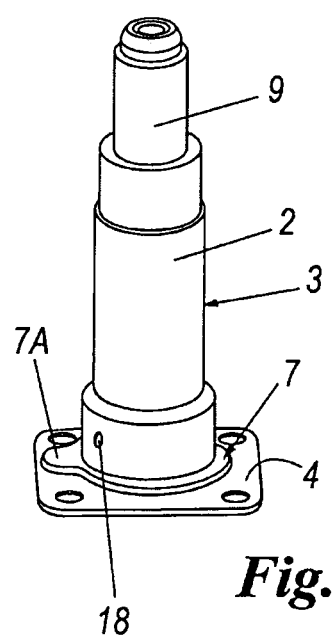
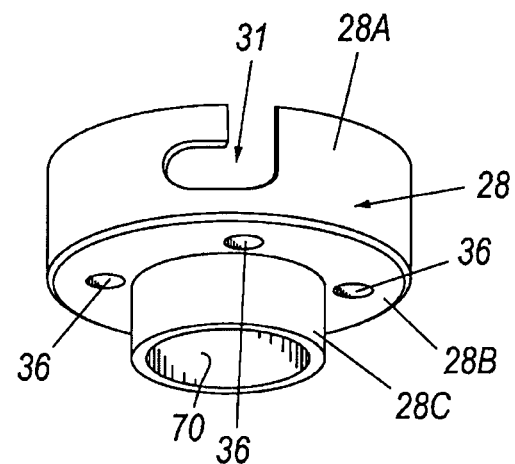
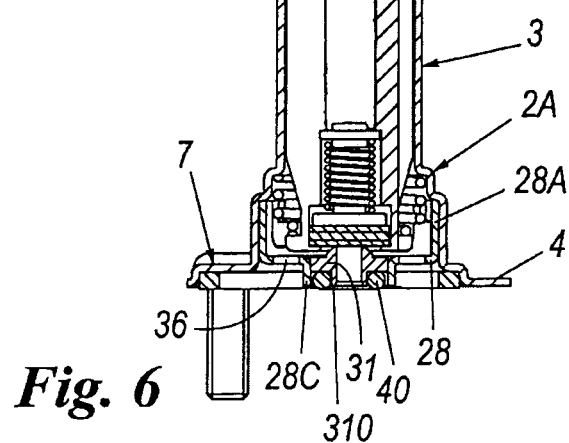

VALVE

CROSS-REFERENCE TO RELATED CASES

This application claims the benefit of U.S. Provisional Application Ser. No. 61/039,445; filed Mar. 26, 2008, the disclosure of which is expressly incorporated herein by reference.

TECHNICAL FIELD

The present invention relates to a valve. In particular it relates to a solenoid valve to be used to intercept miscellaneous fluids intended in particular for food use, such as in coffee machines, or in steam sterilizers or general steam generators in the electro-medical sector.

BACKGROUND

Valves used for intercepting the most varied fluids have long been available commercially. Such valves are much used particularly in the coffee machine sector, especially for machines of professional type. Electromagnetically operated valves are frequently used in this sector.

Professional coffee machines present a boiler connected to a dispensing unit via suitable fluid passages interceptable by said solenoid valves. The dispensing unit comprises in one surface a pair of holes of standardized diameter and distance between axes. The first hole communicates with the spray head of the coffee machine, while the second hole is fed with pressurized hot water from a suitable boiler.

A valve of conventional type is mounted on the surface of the dispensing unit. This valve comprises a valve body in which, in a surface thereof connected to the dispensing unit, two holes are provided having their diameter and distance between axes identical to those provided in the dispensing unit; one of the two is provided in a position axial to the valve, while the second is provided in a side position. At the connection surface the valve body supports a pair of gaskets positioned about the two holes provided in the valve body. The valve body supports an axially holed bush, usually of stainless steel. In that side of the valve body opposite the connection surface there is provided an internally threaded dead-ended hole coaxial with the valve body. This hole communicates with the axial hole via the bush, and with the side hole. An externally threaded ring welded to a core guide tube is screwed into the thread.

The cup-shaped piece is closed at its top by an element welded to it. This element can be of different form depending on the type of valve to which it is welded. In particular it can differentiate a three-way valve from a two-way valve. A conventional valving element (or moving core) is movable in the core guide tube between a first and a second position against a spring. When in its first position the valving element abuts against the steel bush and closes its hole. When in its second position it frees the bush hole and connects it to the side hole of the valve body, to allow fluid passage. Consequently, when the valving element is in its first position the dispensing unit is not fed, whereas when the valving element is in its second position the pressurized hot water flows from the axial hole to the side hole, through the first hole of the dispensing unit towards the spray head.

A valve conceived in this manner presents considerable drawbacks. A first of these is that it is constructionally complicated. In this respect, to construct it the valve body has to be cast and then mechanically machined. The mechanical machining operations to be carried out on this component are extremely complex as it has to be drilled in several points, it has to be milled, the seat for the bush has to be formed and threaded. This all starts from a workpiece usually of forged brass construction. The choice of brass lies in its simplicity of machining by chip removal and for its resistance to utilization temperatures. In addition a ring has to be made and welded to the cup-shaped piece.

A further drawback of the known art is that to make the brass compatible with food use (to avoid extraction of the zinc or lead contained in the alloy), it is covered with a nickel layer, usually by a chemical bath (Nipploy process or Nichel Chimico). This nickel plating gives rise to a series of problems. Firstly, it represents a further operation to which the valve body has to be subjected. Even if this operation is carried out with care, it is always possible for nickel residues to remain, which contaminate the water passing through the valve body. Finally, if the nickel plating is not perfect and if chlorine is contained in the water (as is often the case in water originating from the domestic main), the chlorine attacks the nickel and penetrates below it, between the nickel layer and the brass, to gradually detach the entire coating. Hence although nickel plating eliminates the problem of water contamination by the lead or zinc contained in the brass, it creates the possible problem of water contamination by nickel.

SUMMARY OF THE INVENTION

At least one embodiment of the invention provides a valve comprising: a cup-shaped element having an outer surface on which a driver element is mountable, a core inserted in the cup-shaped element, the core comprising at least one seal element arranged to block a first fluid passage provided in a bush, the core being movable within the cup-shaped element against the action of an elastic element between a first position in which the seal element rests on the bush such as to close its first passage and a second position in which the seal element is detached from the bush such as to open its first passage, the bush being associated with a closure element for the cup-shaped element, the closure element including means cooperating with an inner surface of said cup-shaped element for its fixing to the cup-shaped element.

BRIEF DESCRIPTION OF THE DRAWINGS

Further characteristics and advantages of the invention will be apparent from the description of a preferred but non-exclusive embodiment of the valve of the invention, illustrated by way of non-limiting example in the accompanying drawings, in which:

FIG. 2 is a side sectional view of a valve of FIG. 1 shown in its closed position;

FIG. 3 is a side sectional view of a valve of FIG. 1 shown in its open position;

FIG. 4 is a perspective view of the valve of the present invention, shown complete and ready for use;

FIG. 5 shows an enlarged constructional component of the valve of FIG. 1; and

FIG. 6 is a side sectional view of a different embodiment of the valve of FIG. 1.

DETAILED DESCRIPTION OF THE DRAWINGS

Figure 1:
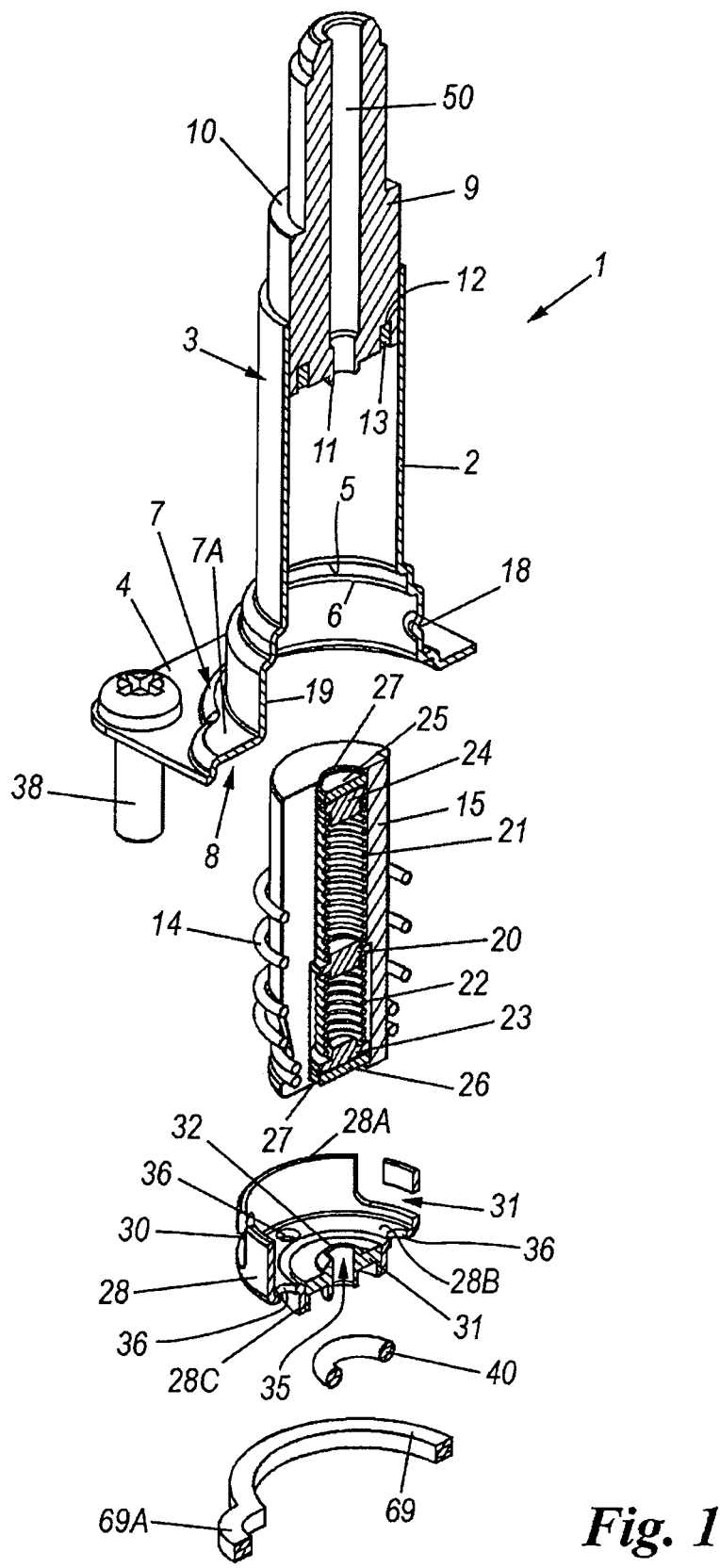
FIG. 1 is a sectional exploded perspective view of a three-way valve according to the present invention.

With reference to said figures, these show a valve indicated overall by the reference numeral 1. The valve in question presents a cup-shaped element 3 presenting an outer surface 2 on which a driver element, such as an electromagnet, can be mounted. The cup-shaped element 3 is produced in one piece by deep pressing from a plate of food quality stainless steel. The cup-shaped element presents a first cylindrical portion 2A which at one end presents a connection flange 4 integral therewith. The cylindrical portion 2A presents a first step 5 and a second step 6. In the connection portion between the flange 4 and the cylindrical portion 2A of the cup-shaped piece 3 a re-entrant portion 7 is present, defining a housing 8 for a seal gasket 69 shaped perimetrally as said housing 8. The re-entrant portion is of substantially circular shape with a radial protuberance 7A.

The flange 4 is in the shape of a square preferably of standard dimensions, for example 16×16 mm or 24×24 mm. These dimensions enable the valve to be connected to conventional currently available dispensing units and/or to other devices comprising the same connectors and communication holes. A stop with connector (or fixed core) 9 is welded to that end of the cup-shaped piece 3 distant from the flange 4, along a welding line 10. The fixed core 9 welded to the cup-shaped element 3 defines the type of valve, in particular it differing if the valve is a two-way or three-way valve. In the example shown in FIGS. 1, 2, 3, and 4 the valve is a three-way valve. Consequently the fixed core 9 is axially holed and presents a projecting rim 11, which surrounds the axial hole 50 at an opening of said hole 50, which serves as a discharge or second way. In addition it presents about the hole 50 a groove 12 housing a metal ring 13 usually made of copper and known as a phase displacement ring, to eliminate vibration if the coil is used with alternating current.

The cup-shaped element 3 also presents surface bosses 18 on an inner cylindrical wall 19 located between the re-entrant portion 7 and the second step 6. A core 15 is movable in the cup-shaped element 3 against the action of a spring 14. When the core is inserted into the cup-shaped element the spring rests on the step 5.

The core is internally holed and comprises, in a central position thereof, a stop element 20 which is fixed thereto. A spring 21, 22 rests on each side of the stop element 20; a presser element 23, 24 is positioned on the end of each spring. The lower presser element 23 (FIG. 1) thrusts against a synthetic ruby disc 26, which acts as the seal element for the core. The movement of the ruby disc 26 is limited by suitable stops 27. The upper presser element is instead made of rubber. The valve also comprises a closure element 28. The closure element is made by pressing from a stainless steel sheet and presents a first cylindrical wall 28A, connected by a connection portion 28B to a second cylindrical wall 28C, coaxial to the first but of smaller diameter.

The closure element 28 presents means for its fixing to the cup-shaped piece 3. These fixing means comprise three L-shaped slots 30 provided in the wall 28A, to cooperate with the bosses 18 of the cup-shaped element, for bayonet coupling. The second wall 28C of the closure element defines a seat 70 for housing a bush 31. The bush 31 presents a first axial passage 35, with a rim 32 about that opening of said axial passage 35 facing the interior of the cup-shaped element. At the opposite end, about that opening of the first passage facing the exterior of the cup-shaped element it presents a circular groove for housing an O-ring; the groove is of inverted U cross-section.

The bush is locked by interference with the wall 28C of the cup-shaped element. Four holes 36 are provided in the connection portion 28B of the cup-shaped element to define second passages for fluid into the valve internal chamber. The valve 1 of the present invention operates in the following manner. The valve is initially mounted on a dispensing unit of a coffee machine or other devices provided with the same connector and communication holes. A second hole of the dispensing unit, connected to a pressurized hot water source, is aligned with the first passage 35, the O-ring 40 sealing the valve on said second hole. The first hole of the dispensing unit is positioned below the protuberance 7A provided in the recessed portion 7. The gasket 69 is aligned such that its protuberance 69A is superposed on the first hole of the dispensing unit. At this point four screws 38 are tightened, screwed into suitable holes provided in the dispensing unit. A conventional electromagnet is mounted on the cup-shaped element 3 and fixed thereto in known manner.

When the electromagnet is not energized (see FIG. 2), the spring 14 (or other elastic element) urges the core towards the closure element; specifically the seal disc 26 is pressed by the spring 14 against the rim 32 provided about the first passage 35. The first passage 35 is hence closed, with the pressurized water present in the first passage remaining confined therein; the gasket 40 prevents seepage of pressurized water towards the first passage of the dispensing unit. The first hole of the dispensing unit communicates via the second passages 36 with the interior of the cup-shaped element 3. The hole provided in the fixed core 9 is open, this latter consequently being in communication with the interior of the cup-shaped piece 3.

When the electromagnet is energized it moves into the position shown in FIG. 3, in which the seal 25 is brought into contact with the rim 11 surrounding the hole provided in the fixed core 9, to hence close the second passage 50 provided therein. At the same time the ruby disc 26 is raised from the rim 32, hence freeing the first passage 35. The hot water fed through this first passage 35 fills the interior of the cup-shaped piece 3 and, being unable to flow through the second passage 50 provided in the fixed core 9, passes through the second passages 36 and flows into the first passage provided in the dispensing unit, to hence reach the spray head. The gasket 69 prevents this fluid from dispersing over the surface of the dispensing unit. When the electromagnet is deactivated the core 15 returns to the position of FIG. 2, urged by the spring 14 to close the first passage 35. The excess pressure remaining in the conduits of the dispensing unit is hence released through the hole 50 in the fixed core.

A valve conceived in this manner is extremely advantageous, both because of its constructional simplicity compared with traditional valves, and because of the absence of brass parts. In this respect the valve in question is easy to produce mainly by pressing, none of its components requiring chip removal machining operations as required to produce a traditional valve body. Consequently, there is no economical or technical need to insert parts of brass therein which, as known, is used for its easy chip removal machinability.

FIG. 6 shows an alternative embodiment of the aforedescribed valve. Valve parts identical to those of the preceding valve will not be further described, whereas the same reference numerals will be used to indicate parts functionally similar to those described. The valve shown in FIG. 6 differs from that already described mainly by being a two-way valve. The fixed core has no hole, and the spring 21, presser 24 and rubber element 25 are absent from the valving element. This valve also presents certain variants which can also be provided on the previously described three-way valve. These variants comprise the method for fixing the closure element 28 to the cup-shaped element 3. In this embodiment, fixing is by interference between the surface of the inner wall 19 of the cup-shaped element 3 and the first wall 28A of the closure element. Specifically, there are no L-shaped apertures in the wall 28A, and the inner wall of the cup-shaped part is without bosses.

In addition, the bush is of slightly different form than that previously described. It does not present a recess in the portion housing the O-ring 40 but simply an annular projection 310 about which the O-ring 40 is positioned. A portion of the second wall 28C of the closure element defines the seat for the said O-ring. These different technical solutions can also be applied to a three-way valve such as that previously described.

The two embodiments illustrated are susceptible to numerous variants. For example, the closure element 28 can be formed in one piece with the bush 31. The means for fixing the closure element 28 to the cup-shaped piece can be replaced by a thread, cooperating with a corresponding thread provided in the inner surface of the cup-shaped piece 3.

These fixing means can also provide for the closure element 28 to be simply inserted into the cup-shaped element, the walls 28A and 19 not presenting interference but performing only the function of maintaining the bush 31 coaxial. In this case, fixing is by the screws which fix the valve to the fluid dispensing unit. In other words the closure element 28 is fixed between the step 6 and the surface of the fluid dispensing unit. In a still different embodiment the flange 4 is of substantially circular shape with two radial protuberances in which the fixing holes are provided.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A valve comprising:
   a cup-shaped element having an outer surface on which a driver element is mountable and a flange having a surface for connecting the valve to a dispensing unit and a re-entrant portion defining a housing for a seal gasket, the re-entrant portion having a substantially circular configuration with a radial protuberance, the protuberance being superposed on a dispensing hole for the fluid when the valve is mounted on the dispensing unit;
   a core inserted in the cup-shaped element, the core comprising at least one seal element arranged to block a first fluid passage provided in a bush, the core being movable within the cup-shaped element against the action of an elastic element between a first position in which the seal element rests on the bush to close the first fluid passage and a second position in which the seal element is detached from the bush to open the first fluid passage, the bush being associated with a closure element for the cup-shaped element,
   the closure element cooperating with an inner surface of said cup-shaped element to fix the closure element to the cup-shaped element,
   wherein the core, the bush and the closure element are disposed on the same side of the surface of the flange for connecting the valve to the dispensing unit.

2. The valve of claim 1, wherein the cup-shaped element, the flange, and the re-entrant portion are formed in one piece.

3. The valve of claim 1, wherein the closure element comprises at least one second passage for fluid, through which the fluid can flow when the core is in its second position.

4. The valve of claim 1, wherein the flange is of square shape, passage holes being provided at the corners of the square for screws for fixing the valve to the dispensing unit.

5. The valve of claim 1, wherein the cup-shaped element comprises a first step on which the elastic element rests and a second step on which side wall of the closure element rests.

6. The valve of claim 1, wherein the driver element is an electromagnet.

7. The valve of claim 1, further comprising a seal gasket in said housing defined by the re-entrant portion.

8. The valve of claim 1, further comprising a fixed core coupled to the cup-shaped element distant from the flange, the fixed core having a passage therethrough that is in fluid communication with an interior of the cup-shaped element via an opening, wherein the opening is closed by the core when the core is in the second position.

9. The valve of claim 1, wherein the closure element comprises an outer cylindrical part that cooperates with the cup-shaped element.

10. The valve of claim 9, wherein the outer cylindrical part of the closure element is fixed into the cup-shaped element by friction.

11. The valve of claim 1, wherein the closure element comprises a bayonet coupling.

12. The valve of claim 11, wherein the cup-shaped element includes a boss cooperating with an L-shaped groove provided in the wall of the closure element.

13. The valve of claim 1, wherein the closure element comprises a housing seat for the bush.

14. The valve of claim 13, wherein the bush comprises a protuberance defining a first annular housing for an O-ring.

15. The valve of claim 14, wherein the first annular housing is perimeterally bounded by a further part of the bush.

16. The valve of claim 14, wherein the first annular housing is perimeterally bounded by a portion of the seat.

17. A valve comprising:
   a cup-shaped element having an outer surface on which an electromagnet driver is mountable and a flange having a surface for directly connecting the valve to a dispensing unit;
   a core inserted into the cup-shaped element, the core comprising at least one seal element arranged to block a first fluid passage provided in a bush, the core being movable within the cup-shaped element against the action of an elastic element between a first position in which the seal element rests on the bush to close the first fluid passage and a second position in which the seal element is detached from the bush to open the first fluid passage, the bush being associated with a closure element for the cup-shaped element, the closure element including means cooperating with an inner surface of said cup-shaped element to fix the closure element to the cup-shaped element,
   the closure element comprises at least one second passage for fluid, through which the fluid can flow when the core is in the second position,
   the core, the bush and the closure element are disposed on the same side of the surface of the flange for connecting the valve to the dispensing unit,
   wherein the flange includes a re-entrant portion defining a second housing for a seal gasket, the re-entrant portion having a substantially circular configuration with a radial protuberance, the protuberance being superposed on a dispensing hole for the fluid when the valve is mounted on the dispensing unit.

18. The valve of claim 17, wherein the bush comprises a protuberance defining a first annular housing for an O-ring.

19. The valve of claim 17, further comprising a seal gasket in said housing defined by the re-entrant portion.

20. The valve of claim 17, further comprising a fixed core coupled to the cup-shaped element distant from the flange, the fixed core having a passage therethrough that is in fluid communication with an interior of the cup-shaped element via an opening, wherein the opening is closed by the core when the core is in the second position.

\* \* \* \* \*